US011272694B2

(12) United States Patent
Landsman et al.

(10) Patent No.: US 11,272,694 B2
(45) Date of Patent: Mar. 15, 2022

(54) AQUACULTURE FILTRATION SYSTEMS

(71) Applicant: The tru Shrimp Company, Balaton, MN (US)

(72) Inventors: Angela Kaye Landsman, Slayton, MN (US); Rodney Alan Johnson, Balaton, MN (US)

(73) Assignee: THE TRU SHRIMP COMPANY, Balaton, MN (US)

( * ) Notice: Subject to any disclaimer, the term of this patent is extended or adjusted under 35 U.S.C. 154(b) by 0 days.

(21) Appl. No.: 16/904,244

(22) Filed: Jun. 17, 2020

(65) Prior Publication Data

US 2020/0396969 A1 Dec. 24, 2020

Related U.S. Application Data

(60) Provisional application No. 62/863,373, filed on Jun. 19, 2019.

(51) Int. Cl.
| *A01K 63/04* | (2006.01) |
| *C02F 3/30* | (2006.01) |
| *C02F 1/00* | (2006.01) |
| C02F 101/16 | (2006.01) |
| C02F 103/20 | (2006.01) |

(52) U.S. Cl.
CPC ............ *A01K 63/045* (2013.01); *C02F 1/001* (2013.01); *C02F 3/305* (2013.01); *C02F 2101/166* (2013.01); *C02F 2103/20* (2013.01)

(58) Field of Classification Search
CPC ....... A01K 63/045; A01K 63/04; C02F 3/305; C02F 1/001; C02F 2101/166; C02F 2103/20; C02F 2209/40; C02F 2303/16; C02F 2103/08; C02F 3/104; C02F 1/004; Y02P 60/60; Y02W 10/10

USPC .......... 210/167.21, 615, 616, 617, 618, 903; 119/227, 260

See application file for complete search history.

(56) References Cited

U.S. PATENT DOCUMENTS 4,043,299 A * 8/1977 Birkbeck ............... A01K 63/04
119/227
5,466,373 A 11/1995 Handwerker et al.
(Continued)

FOREIGN PATENT DOCUMENTS

JP 57-45391 A * 3/1982

OTHER PUBLICATIONS

"International Search Report and Written Opinion for PCT/US2020/038125", dated Sep. 3, 2020, 17 pages.

*Primary Examiner* — Fred Prince
(74) *Attorney, Agent, or Firm* — Billion & Armitage

(57) ABSTRACT

Embodiments of the present disclosure describe aquaculture filtration systems comprising a tidal basin, first bead filter unit, second bead filter unit, and optionally an inoculation tank. The tidal basin and first bead filter unit can be in fluid communication. The first bead filter unit can be in fluid communication with the second bead filter unit and optionally the tidal basin via a bypass line. The second bead filter unit can be in fluid communication with the tidal basin and optionally an inoculation tank via an inoculation loop. The aquaculture filtration systems can optionally further comprise pumps for circulating fluids, such as circulation pumps and inoculation pumps, and valves for controlling or directing fluid flow. Embodiments also describe related methods, systems, apparatuses, and the like.

18 Claims, 7 Drawing Sheets

(56) References Cited

U.S. PATENT DOCUMENTS

| | | |
|---|---|---|
| 6,171,480 B1 | 1/2001 | Lee et al. |
| 6,517,724 B1 | 2/2003 | Malone |
| 6,638,422 B1 | 10/2003 | Schwartzkopf |
| 7,807,053 B2 | 10/2010 | Smith |
| 9,756,799 B2 | 9/2017 | Lee |
| 10,251,375 B2 | 4/2019 | Gervais et al. |
| 2005/0029204 A1 | 2/2005 | Schwartzkopf |
| 2013/0134100 A1 | 5/2013 | Mcgrady et al. |
| 2017/0150701 A1 | 6/2017 | Gilmore et al. |

\* cited by examiner

AQUACULTURE FILTRATION SYSTEMS

BACKGROUND

Aquaculture may be described as the process of farming aquatic organisms, including plants, animals, or the like, for human consumption as a food source or other uses. In some aquaculture systems, an artificial environment is created that is suitable for habitation and growth of farmed plants or animals.

One important aspect of successful aquaculture is to provide a clean aqueous environment for organisms to live and thrive. For example, it may be important for successful aquaculture to provide for constant or relatively constant filtration of liquid water.

Known techniques for providing water filtration for aquaculture purposes suffer from drawbacks, in expense, degree of maintenance required, and complexity. In light of these deficiencies, a need exists for improved filtration techniques for the filtering of water for purposes of aquaculture.

SUMMARY

In general, embodiments of the present disclosure describe filtration systems for aquaculture, wastewater treatment, and other water treatment applications.

Embodiments of the present disclosure describe aquaculture filtration systems comprising a tidal basin, first bead filter unit, second bead filter unit, and optionally an inoculation tank. The tidal basin and first bead filter unit can be in fluid communication. The first bead filter unit can be in fluid communication with the second bead filter unit and optionally the tidal basin via a bypass line. The second bead filter unit can be in fluid communication with the tidal basin and optionally an inoculation tank via an inoculation loop. The aquaculture filtration systems can optionally further comprise pumps for circulating fluids, such as circulation pumps and inoculation pumps, and valves for controlling or directing fluid flow.

Embodiments of the present disclosure also describe aquaculture filtration systems operable in one or more phases, including, but not limited to, a filtering phase, back-flushing phase, and inoculation phase. In a filtering phase, the first bead filter unit is operable to remove first impurities from water and/or the second bead filter unit is operable to remove second impurities from water. In a back-flushing phase, the first bead filter unit is operable to remove a first waste from the first bead filter unit and/or the second bead filter unit is operable to remove a second waste from the second bead filter unit. In an inoculation phase, fresh water or chemicals are flushed throughout the aquaculture filtration system or components thereof to kill or otherwise remove undesirable bacteria or a stock solution is circulated from the inoculation tank to the second bead filter unit to grow biological agents on surfaces of the second bead filter, or both.

Embodiments of the present disclosure describe aquaculture filtration systems comprising a first bead filter unit comprising a first bead filter, wherein the first bead filter unit receives water from a tidal basin and is operable to: in a first filtering phase, remove first impurities from the water using the first bead filter; and in a first back-flushing phase, remove a first waste from the first bead filter unit; and a second bead filter unit comprising a second bead filter, wherein the second bead filter unit receives water from the first bead filter unit and is operable to: in a second filtering phase, remove second impurities from the water using the second bead filter; and in a second back-flushing phase, remove a second waste from the second bead filter unit; wherein the first back-flushing phase of the first bead filter unit is operable independently of the second back-flushing phase of the second bead filter unit.

Embodiments of the present disclosure further describe methods of operating an aquaculture filtration system comprising operating an aquaculture filtration system in a filtering phase, wherein the filtering phase includes: supplying water from a tidal basin to a first bead filter unit to remove first impurities from the water; supplying water from the first bead filter unit to the second bead filter unit to remove second impurities from the water; and supplying water from the second bead filter unit to the tidal basin to sustain and/or promote a life of aquatic organisms residing in the tidal basin; and operating the first bead filter unit, second bead filter unit, or both in a back-flushing phase, wherein the back-flushing phase includes: removing a first waste from the first bead filter unit at a first frequency; and removing a second waste from the second bead filter unit at a second frequency.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Embodiments of the present disclosure describe aquaculture filtration systems, methods of using the aquaculture filtration systems, and the like.

Figure 1A:
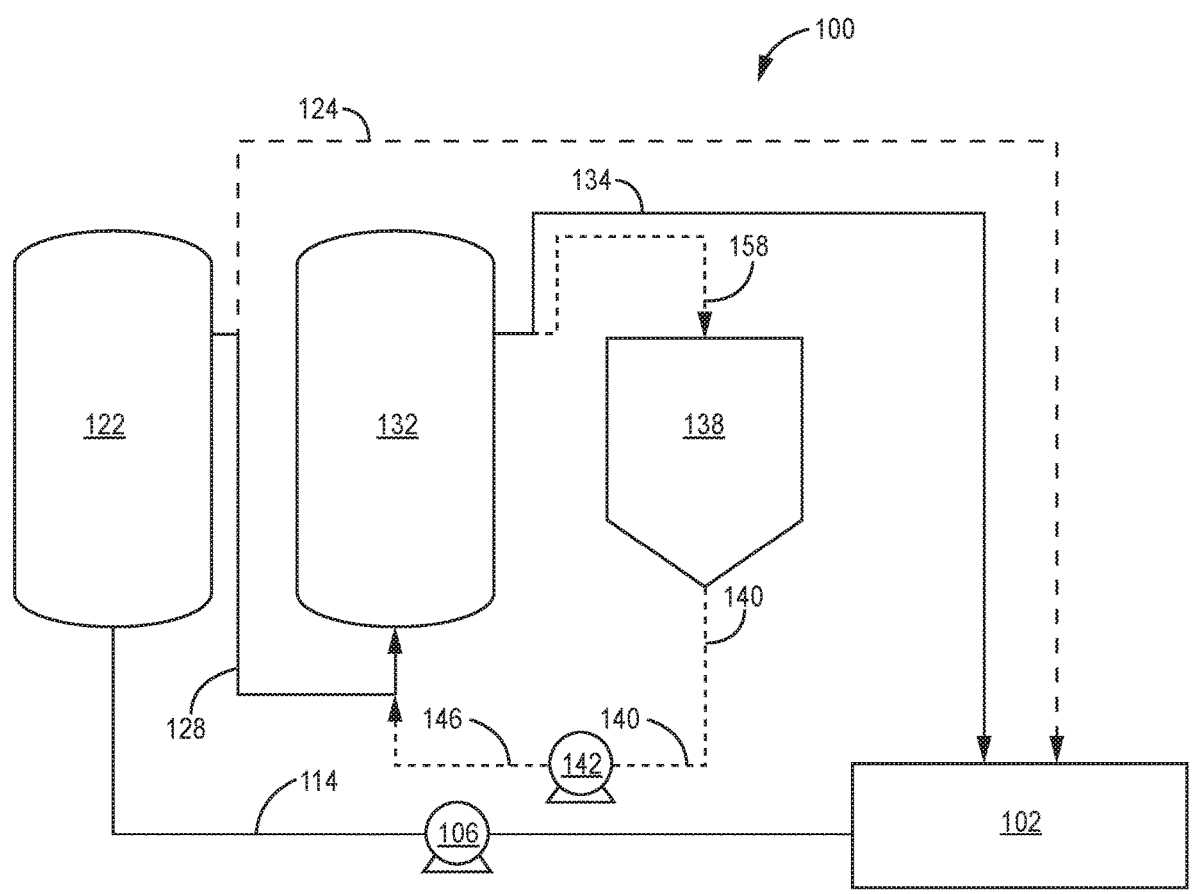
FIG. 1A is a schematic diagram of an aquaculture filtration system, according to one or more embodiments of the present disclosure.

FIG. 1A is a schematic diagram of an aquaculture filtration system, according to one or more embodiments of the present disclosure. As shown in FIG. 1A, the aquaculture filtration system 100 can comprise a tidal basin 102, a first bead filter unit 122, and a second bead filter unit 132. Although not shown and as will be discussed in more detail below, the first bead filter unit 122 and the second bead filter unit 132 can each independently include a first bead filter and a second bead filter, respectively. In a typical configuration, the tidal basin 102 is in fluid communication with the first bead filter unit 122 through conduit 114. The first bead filter unit 122 is further in fluid communication with the second bead filter unit 132 through conduit 128 and optionally the tidal basin 102 via a bypass line 124. The bypass line 124 can be used to bypass the second bead filter unit 132. The second bead filter unit 132 is further in fluid communication with the tidal basin 102 through conduit 134 and optionally the inoculation tank 138 through conduit 158. The inoculation tank 138 can be in fluid communication with the second bead filter unit 132 through conduits 140 and 146 or through a single conduit (not shown). In some embodiments, the second bead filter unit 132, the inoculation tank 138, and one or more conduits (e.g., conduits 140, 146, and 158) form an inoculation loop for circulating a stock solution to grow biological agents on surfaces of the second bead filter (not shown). The system 100 can optionally further comprise circulation pump 106 and inoculation pump 142.

Figure 1B:
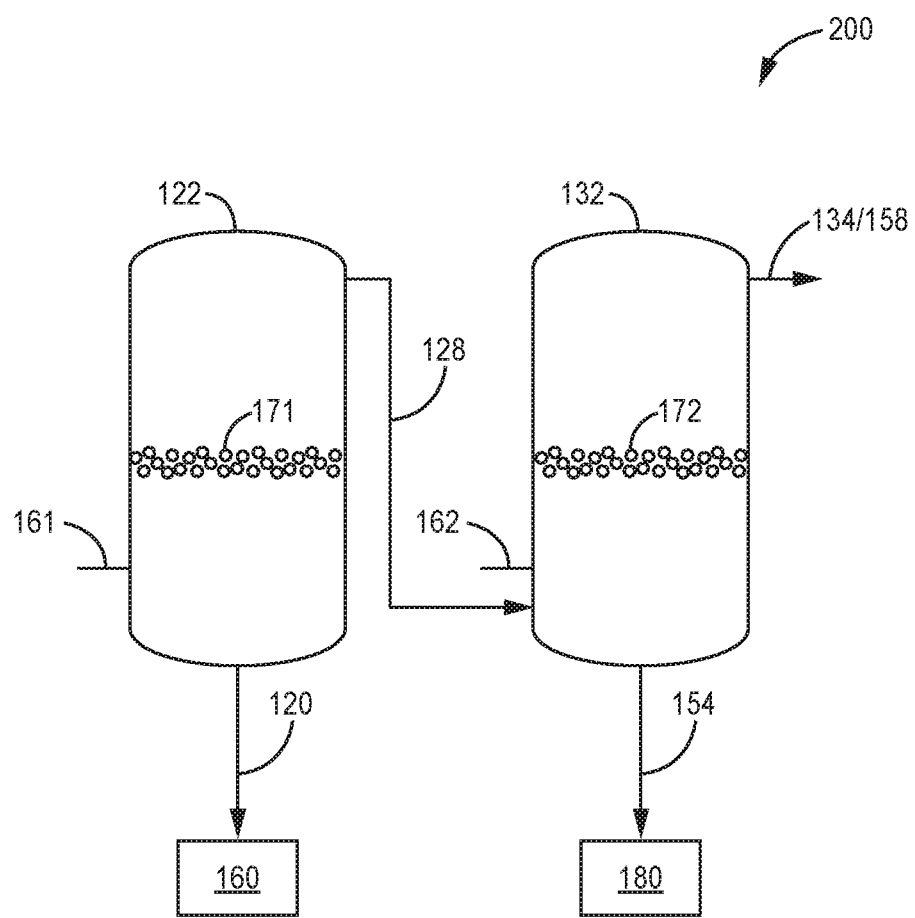
FIG. 1B is a schematic diagram of the first bead filter unit and the second bead filter unit, according to one or more embodiments of the present disclosure.

FIG. 1B is a schematic diagram of the first bead filter unit 122 and the second bead filter unit 132, according to one or more embodiments of the present disclosure. As shown in FIG. 1B, the first bead filter unit 122 can include a first bead filter 171 and an air inlet 161. The air inlet 161 can be positioned in the bottom portion of the first bead filter unit 122 (e.g., about half-way to about two-thirds of the way down the unit) and can be configured (e.g., opened) to introduce air into the first bead filter unit 122. In other embodiments, the air inlet 161 can be positioned in one or more of the middle portion of the first bead filter unit 122 and the upper portion of the first bead filter unit 122, or anywhere therebetween. The positioning of the first bead filter 171 relative to the first bead filter unit 122 is not particularly limited, so long as at least a portion of the first bead filter 171 is positioned above the air inlet 161. The first bead filter unit 122 can also be in fluid communication with a drain 160 or wastewater treatment plant 160 through conduit 120. Conduit 128 can connect the first bead filter unit 122 with the second bead filter unit 132 such that each of the units are in fluid communication with each other.

The second bead filter unit 132 can include a second bead filter 172 and an air inlet 162. The air inlet 162 can be positioned in the bottom portion of the second bead filter unit 132 (e.g., about half-way to about two-thirds of the way down the unit) and can be configured (e.g., opened) to introduce air into the first bead filter unit 132. In other embodiments, the air inlet 162 can be positioned in one or more of the middle portion of the second bead filter unit 172 and the upper portion of the second bead filter unit 172, or anywhere therebetween. The positioning of the second bead filter 172 relative to the second bead filter unit 132 is not particularly limited, so long as at least a portion of the second bead filter 172 is positioned above the air inlet 162. The second bead filter unit 132 can also be in fluid communication with a drain or wastewater treatment plant 180 through conduit 154. The drain or wastewater treatment plant 180 can be the same as or different from the drain or wastewater treatment plant 160. One or more of the conduit 134 and the conduit 158 can connect the second bead filter unit 132 to the inoculation tank 138 (not shown) and/or the tidal basin 102 (not shown) such that the second bead filter unit 132 is in fluid communication with either or both.

Having generally described, among other things, the tidal basin 102, first bead filter unit 122, second bead filter unit 132, bypass line 124, inoculation tank 138, inoculation loop, and their arrangement in the aquaculture filtration system 100, the aquaculture filtration system 100 and operation thereof will be described in more detail. The aquaculture filtration systems can be operated in one or more of three operating phases. The three phases of operation can include a filtering phase, a back-flushing phase, and an inoculation phase.

During normal operation, the aquaculture filtration system 100 is operable in a filtering phase to remove impurities from tidal basin water. In general, the filtering phase involves directing water or wastewater from a tidal basin through one or more bead filter units configured to provide mechanical filtration, biological filtration, and/or other water treatments. The mechanical filtration can remove solids and other physical matter from the water. The biological filtration can reduce total ammonia nitrogen (TAN) (e.g., ammonia- and/or ammonium-nitrogen), nitrite, and/or nitrate levels. After passing through the bead filter units, the water can be returned or recycled back to the tidal basin in a form suitable for cultivating and/or sustaining the life of the aquatic organisms residing therein.

In the filtering phase, the aquaculture filtration system can comprise one or more bead filters arranged in a variety of configurations. For example, in some embodiments, one or more first bead filter units are arranged in series with one or more second bead filter units. In these embodiments, the one or more first bead filter units and the one or more second bead filter units are in fluid communication such that water from the tidal basin flows through the one or more first bead filter units and the one or more second bead filter units before returning back to the tidal basin. In some embodiments, each of the one or more bead filter units is configured for a designated function selected from mechanical filtration, biological filtration, or any aspect or combinations thereof. For example, in one embodiment, one or more first bead filter units is configured to provide mechanical filtration and one or more second bead filter units is configured to provide biological filtration. In another embodiment, one or more first bead filter units is configured to provide one aspect of biological filtration and optionally mechanical filtration, and one or more second bead filter units is configured to provide another aspect of biological filtration and optionally mechanical filtration. For example, one or more first bead filter units can be configured to reduce TAN levels (or nitrite levels) and optionally remove solids, and one or more second bead filter units can be configured to reduce nitrite levels (or TAN levels) and optionally remove solids. In some embodiments, one or more third bead filter units is arranged in series with the one or more first bead filter units and the one or more second bead filter units, wherein the one or more first bead filter units is configured to remove solids, the one or more second bead filter units is configured to reduce TAN levels (or nitrite levels), and the one or more third bead filter units is configured to reduce nitrite (or TAN) levels. Other configurations are possible and within the scope of the present disclosure.

In other embodiments, one or more first bead filter units is operated in parallel with one or more second bead filter units. In these embodiments, the first bead filter units and second bead filter units are not directly in fluid communication to the extent that water flowing through the first bead filter units is returned to the tidal basin without passing through the second bead filter units. Similarly, water flowing through the second bead filter units is returned to the tidal basin without passing through the first bead filter units. In one embodiment, the first bead filter units are configured to provide mechanical filtration and the second bead filter units are configured to provide biological filtration. In another embodiment, the first bead filter units are configured to provide one aspect of biological filtration and optionally mechanical filtration, and the second bead filter units are configured to provide another aspect of biological filtration and optionally mechanical filtration. For example, the first bead filter units can be configured to reduce TAN levels and optionally remove solids and the second bead filter units can be configured to reduce nitrite levels and optionally remove solids. In some embodiments, third bead filter units are arranged in parallel with the first and second bead filter units, wherein the first bead filter units remove solids, the second bead filter units reduce TAN levels, and the third bead filter units reduce nitrite levels. At least one benefit of a parallel configuration is that it can provide greater control over solids removal, TAN levels, and/or nitrite levels by simply increasing or decreasing the flow rate of water through each of the first, second, and/or third bead filter units. Other configurations are possible and thus these shall not be limiting.

In an embodiment, in a filtering phase, the first bead filter unit 122 can be operable to remove/filter first impurities (e.g., particles) from the water; and the second bead filter unit 132 can be operable to remove/filter second impurities (e.g., chemical and biological impurities) from the water. The first and second impurities can be removed by collecting each on surfaces of the first bead filter 171 and the second bead filter 172, respectively. The first and second bead filters 171 and 172 can include a first plurality of beads and a second plurality of beads, respectively. The second bead filter 172 can further include a plurality of biological agents grown on surfaces of the second plurality of beads for the collection of impurities, such as biological and chemical impurities. The filtering phase can proceed over a period of days or weeks, such as about 100 days, or longer. The duration of the filtering phase is not particularly limited and thus can proceed for longer or shorter durations.

Over the course of operating in the filtering phase, the impurities can build up as waste in the first bead filter unit 122, the second bead filter unit 132, as well as the conduits interconnecting those units with the tidal basin 102. Accordingly, normal operation of the aquaculture filtration system 100 can be temporarily stopped and the aquaculture filtration system 100 can be operated in a back-flushing phase to remove the waste from the units 122 and 132 and flush such waste from or through the conduits. Each of the first bead filter unit 122 and the second bead filter unit 132 can be isolated from the rest of the aquaculture filtration system 100 before being operated in a back-flushing phase. The back-flushing of the first bead filter unit 122 can be performed independent of the back-flushing of the second bead filter unit 132. In addition, the back-flushing of each unit can be performed at different frequencies. For example, the first bead filter unit 122 can be back-flushed at a first frequency and the second bead filter unit 132 can be back-flushed at a second frequency. The first frequency and the second frequency can be different. Typically, the first frequency is greater than the second frequency.

In an embodiment, the first bead filter unit 122 can be operable to, in a first back-flushing phase, remove a first waste from the first bead filter unit 122. In a first back-flushing phase, the first bead filter unit 122 can be isolated from the rest of the aquaculture filtration system 100 and then the waste can be removed by introducing air into the first bead filter unit 122 through air inlet 161. The introduced air can agitate and loosen the waste collected on the first bead filter 171 so that it settles. The waste can then subsequently or simultaneously be drained from the first bead filter unit 122. After draining the first bead filter unit 122, a fluid can be flushed through the first bead filter unit 122 and the bypass line 124 to remove any residual waste therefrom. The bypass line 124 can be used to avoid taking the second bead filter unit 132 offline and to preserve the biological agents residing on surfaces of the second bead filter. This way the longer process of growing bacteria can be avoided.

In an embodiment, the second bead filter unit 132 can be operable to, in a second back-flushing phase, remove a second waste from the second bead filter unit 132. The back-flushing phase of the second bead filter unit 132 can operate in a manner similar to the back-flushing phase of the first bead filter unit 122, except generally a fluid is not flushed through the second bead filter unit 132 after draining it. Accordingly, in a second back-flushing phase, the second bead filter unit 132 can be isolated from the rest of the aquaculture filtration system 100 and then the waste can be removed by introducing air into the second bead filter unit 132 through air inlet 162. The introduced air can agitate and loosen the waste collected on the second bead filter 172 so that it settles. The waste can then subsequently or simultaneously be drained from the second bead filter unit 132. As described above, typically the second bead filter unit 132 is not flushed with a fluid. During back-flushing of the second bead filter unit 132, the first bead filter unit 122 can optionally be operated in a filtering phase using the bypass line.

Upon the completion of the back-flushing phase of either or both of the first bead filter unit 122 and the second bead filter unit 132, the aquaculture filtration system 100 can resume normal operation in the filtering phase.

While the back-flushing phase can be used to remove waste and other deposits, undesirable bacteria can accumulate in the aquaculture filtration system 100. Accordingly, upon completion of the filtering phase (or during startup of the system), the aquaculture filtration system 100 can be taken offline (e.g., aquatic organisms can be removed from the tidal basin and the tidal basin drained) and operated in an inoculation phase to kill or otherwise remove such undesirable bacteria, as well as replace desirable but spent bacteria, grow new bacteria, or supplement existing bacteria with additional bacteria. The inoculation phase thus can include a first stage and a second stage. During the first stage, a fluid, such as fresh water or a chemical fluid, can be flushed through the tidal basin 102, the first bead filter unit 122, and optionally the second bead filter unit 132 to kill or otherwise remove the undesirable bacteria. During the second stage, a stock circulation can be circulated through the inoculation loop to grow bacteria on surfaces of the second bead filter 172. The first stage and second stage can be operated sequentially or simultaneously (e.g., if the bypass line is used).

In an embodiment, in a first stage of the inoculation phase, the aquatic organisms residing in the tidal basin 102 can be removed therefrom and the water sustaining the aquatic organisms, which is typically saltwater, can be drained from the tidal basin 102. The tidal basin 102 can be filled with a cleaning fluid, such as fresh water or chemicals, and the cleaning fluid can be circulated through the aquaculture filtration system 100. For example, the first bead filter unit 122 can receive the cleaning fluid from the tidal basin 102 through conduit 114. In a typical case, the tidal basin 102 receives the cleaning fluid from the first bead filter unit 122 through bypass line 124. However, in some instances, the cleaning fluid can be directed through conduit 128 to the second bead filter unit 132 or circulated through the inoculation loop.

In an embodiment, in a second stage of the inoculation phase, the inoculation loop can be activated to grow (or replace or supplement) biological agents on the second bead filter 172. A stock solution containing the biological agents and feed, among other things, can be loaded into the inoculation tank 138. The second bead filter unit 132 can receive the stock solution from the inoculation tank 138 through a single conduit or conduits 140 and 146. The inoculation tank 138 can receive the stock solution from the second bead filter unit 132 through conduit 158. This can then be repeated one or more times to circulate the stock solution sufficient to achieve a desired population or quantity of biological agents on the second bead filter 172.

In some embodiments, in a second stage of the inoculation phase, each bead filter can be associated with its own inoculation tank, or a single inoculation tank 138 is used to inoculate two or more bead filters. For example, in an embodiment, a single inoculation tank 138 is used to inoculate a first bead filter in fluid communication with a first tidal basin and to inoculate a second bead filter in fluid communication with a second tidal basin. In an embodiment, the aquaculture filtration system can comprise, for example, tidal basin 1 and tidal basin 2, and each tidal basin can comprise a first bead filter unit and a second bead filter unit. In one embodiment, an inoculation tank can be used to inoculate the first bead filter units of tanks 1 and 2 and a different inoculation tank can be used to inoculate the second bead filter units of tanks 1 and 2. In some embodiments, to inoculate a bead filter unit for reducing TAN levels, only ammonia and/or ammonium is fed to the bead filter to promote the growth of bacteria suitable for reducing nitrite levels. Similarly, to inoculate a bead filter for reducing nitrite levels, only nitrite is fed to the bead filter to promote the growth of bacteria suitable for reducing nitrite levels. Alternatively, both nitrite and ammonia can be fed to promote the growth of both types of bacteria.

Figure 1C:
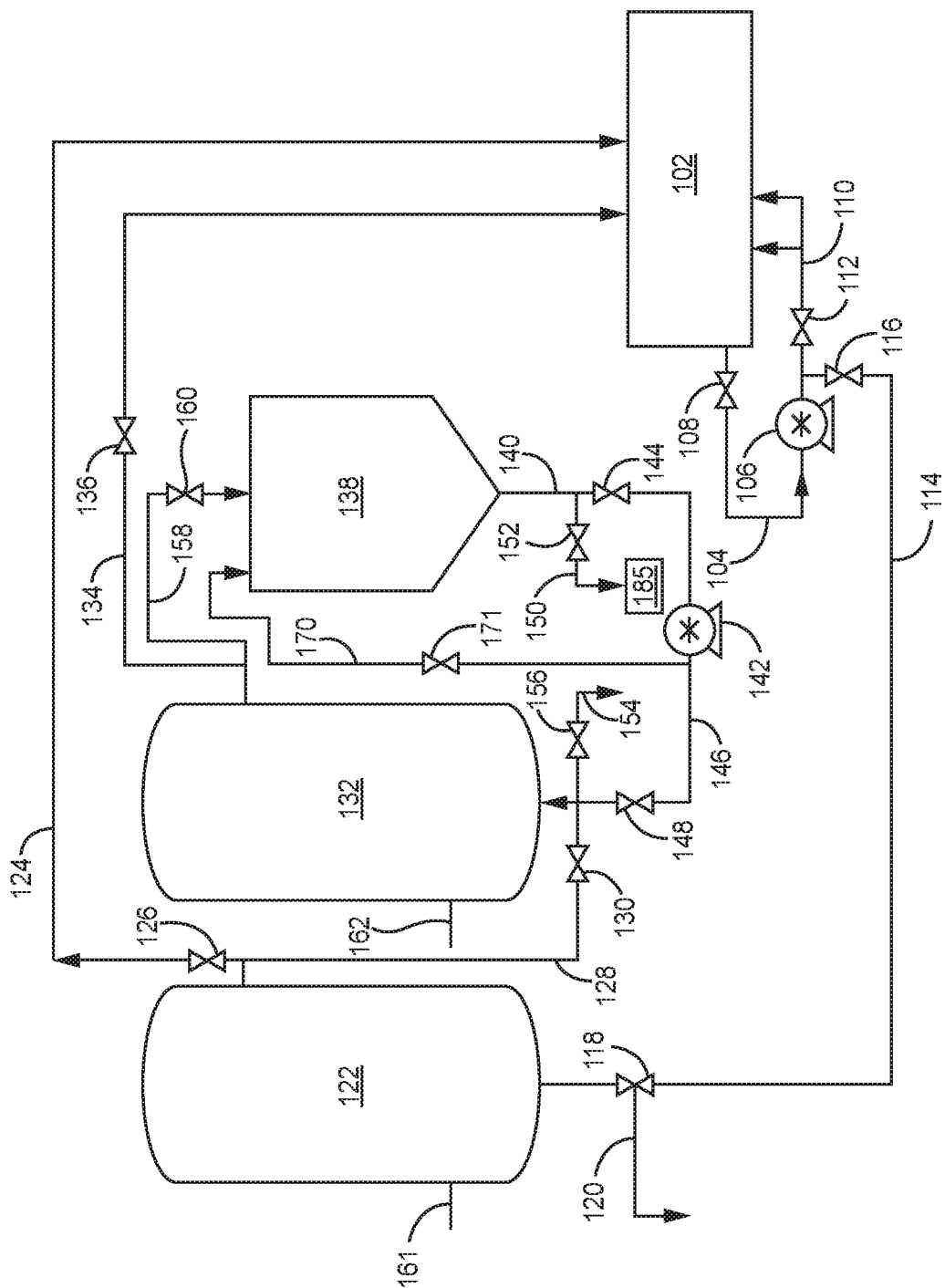
FIG. 1C is a schematic diagram of an aquaculture filtration system, according to one or more embodiments of the present disclosure.

FIG. 1C is a schematic diagram showing the aquaculture filtration system 100 in more detail, including an arrangement of optional valves and optional pipes, according to one or more embodiments of the present disclosure. As shown in FIG. 1C, the first bead filter unit 122 and the second bead filter unit 132 are connected in series and the inoculation tank 138 is used to inoculate the second bead filter unit 132. The system 100 includes tidal basin 102 in fluid communication with circulation pump 106. For example, in an embodiment, the tidal basin 102 can be in fluid communication with the circulation pump 106 through conduit 104 and open valve 108. The circulation pump 106 can, for example, receive the fluid from the tidal basin 102 and supply it to one of the tidal basin 102 and the first bead filter unit 122, or both. In an embodiment, the circulation pump 106 can receive the fluid from the tidal basin 102 and return all or a portion of the fluid to the tidal basin 102 through conduit 110 and open valve 112. The circulation pump 106 can also deliver all or a portion of the fluid to the first bead filter unit 122 through conduit 114 and open valves 116 and 118. The circulation pump 106 typically operates to deliver a portion of the fluid to both the tidal basin 102 and the first bead filter unit 122. One or more of the valves 108, 112, and 116 can be adjusted to control a flow rate of the fluid into the tidal basin 102.

The first bead filter unit 122 can be in fluid communication with the circulation pump 106. For example, in an embodiment, the first bead filter unit 122 can receive the fluid from the circulation pump 106 through conduit 114 and open valve 118.

The fluid exiting from the first bead filter unit 122 can be directed to the tidal basin 102 through conduit 124 via the bypass line 124; or it can be directed to the second bead filter unit 132 through conduit 128. The fluid can be directed through the bypass line 124 to the tidal basin 102 if valve 126 is configured in an open position and valve 130 is configured in a closed position. The fluid can be directed through conduit 128 to the second bead filter unit 132 if valve 126 is configured in a closed position and valve 130 is configured in an open position. The configuration of the valves 126 and 130 can depend on the phase in which the aquaculture filtration system is operating as discussed below. In general, the bypass line 124 can be used whenever it is desirable to bypass the second bead filter 172 (e.g., during back-flushing, inoculation, cleaning, etc.). The second bead filter 172 can be used whenever it is desirable to remove impurities, such as chemical impurities or biological impurities.

The second bead filter unit 132 can receive the fluid from the first bead filter unit 122. For example, in an embodiment, the second bead filter 132 unit can receive the fluid from the first bead filter unit 122 through conduit 128 and open valve 130. The fluid exiting the second bead filter unit 132 can be directed to the tidal basin 102 through conduit 134; or it can be directed to the inoculation tank 138 through conduit 158. The fluid can be directed to the tidal basin 102 through conduit 134 if valve 136 is configured in an open position and valve 160 is configured in a closed position. The fluid can be directed to the inoculation tank 138 through conduit 158 if valve 136 is configured in a closed position and valve 160 is configured in an open position. In some embodiments, conduit 134 connects with conduit 124 to form a single conduit 172 (not shown). The inoculation tank 138 can be in fluid communication with inoculation pump 142 through conduit 140 and valve 144. The inoculation pump 142 can be in fluid communication with the second bead filter 132 through conduit 146 and valve 148. The second bead filter unit 132, inoculation tank 138, and inoculation pump 142 can form the inoculation loop. In some embodiments, an inoculation loop recycle stream 170 and a valve 171 are in fluid communication with conduit 146 and the inoculation tank 138. In other embodiments, the inoculation loop recycle stream 170 and the value 171 are in fluid communication with conduit 140. The inoculation loop recycle stream 170 and the valve 171 may be used for cleaning, flushing, etc. the inoculation tank, among other things.

A drain or wastewater treatment plant can be in fluid communication with one or more of the first bead filter unit 122, the second bead filter unit 132, and the inoculation tank 138. Each of the drains or wastewater treatment plants in fluid communication with the first bead filter unit 122, second bead filter unit 132, and inoculation tank 138 can be the same or different.

The first bead filter unit can be in fluid communication with a drain or wastewater treatment plant 160 through conduit 120 and valve 118, and a portion of conduit 114. The first bead filter unit 122 discharge waste to the drain or wastewater treatment plant 160 through conduit 120 if valve 118 and optionally valve 126 are configured in a closed position.

The second bead filter unit 132 can be in fluid communication with a drain or wastewater treatment plant 180 through conduit 154 and valve 156, and a portion of conduit 146. The second bead filter unit 132 can discharge waste to the drain or wastewater treatment plant 180 through conduit 154 if valve 156 is configured in an open position and optionally one or more of valves 130, 136, 160, and 148 are configured in a closed position.

The inoculation tank 138 can be in fluid communication with a drain or wastewater treatment plant 185 through conduit 150 and valve 152, and a portion of conduit 140. The inoculation tank 138 can discharge waste to the drain or wastewater treatment plant 185 through conduit 150 if valve 152 is configured in an open position and optionally one or more of valves 144 and 160 are configured in a closed position.

In an embodiment, the aquaculture filtration system can operate in a filtering phase. In the filtering phase, water, such as saltwater, from the tidal basin 102 can flow through conduit 104 and open valve 108 to circulation pump 106. From the circulation pump 106, a proportion of the water can be returned to the tidal basin 102 through conduit 110 and open valve 112 and a proportion of the water can flow through conduit 114 and open valves 116 and 118 to the first bead filter unit 122. The proportion of water returned to the tidal basin 102 or flowed to the first bead filter unit 122, and the corresponding flow rates of each, can be controlled by adjusting, for example, valve 112 or valve 116, or both. The proportion of water returned to tidal basin 102 can facilitate aeration and circulation within the tidal basin 102. The proportion of water flowed to the first bead filter unit 122 can be treated in the first bead filter unit 122 for the removal of impurities.

The first bead filter unit 122 receives water from the tidal basin 102. The water from the tidal basin 102 can enter a bottom portion of the first bead filter unit 122 such that the water flow is generally provided in an upwards direction. As the water flows upwards, it can be brought into contact with a first bead filter 171, wherein the first bead filter 171 includes a first plurality of beads. The first plurality of beads can provide a high surface area available for removing impurities (e.g., particles) from the water. For example, upon being contacted with water, particles from the water can collect on surfaces of the first plurality of beads, thereby reducing the concentration of the impurities in the water. The impurities can be collected by physical processes (e.g., sieving, etc.), chemical processes (e.g., adsorption, absorption, etc.), or a combination thereof.

The second bead filter unit 132 receives water from the first bead filter unit 122. The water from the first bead filter unit 122 is directed to the second bead filter unit 132 by configuring valves 126 and 130 to a closed position and an open position, respectively. Although optional, valve 156 should also be configured to a closed position. The water from the first bead filter unit 122 can enter a bottom portion of the second bead filter unit 132, such that the water flow is generally provided in an upwards direction. As the water flows upwards, it can be brought into contact with a second bead filter 172, wherein the second bead filter 172 includes a second plurality of beads and a plurality of biological agents grown on the surfaces of the second plurality of beads. The second plurality of beads can provide a high surface area on which the biological agents can be grown, which can be a desirable feature for removing chemical and/or biological impurities from the water. For example, upon being contacted with water, the biological agents, and optionally the second plurality of beads, can collect chemical and/or biological impurities from the water, thereby reducing the concentration of the chemical and/or biological impurities in the water. The water from the second bead filter unit 132 can be returned to tidal basin 102 through conduit 134 and valve 136.

In an embodiment, the aquaculture filtration system 100 can operate in a back-flushing phase. The back-flushing phase can be implemented to remove waste that has accumulated in the aquaculture filtration system 100 while operating in the filtering phase. More specifically, the back-flushing phase can be implemented to remove waste from the first bead filter unit 122 or the second bead filter unit 132, or both the first bead filter unit 122 and the second bead filter unit 132. The back-flushing phase can be implemented intermittently or periodically during operation of the aquaculture filtration system 100 in the filtering phase. The filtering phase is typically interrupted (e.g., taken offline) whenever the first bead filter unit 122 is operating in a back-flushing phase. Where only the second bead filter unit is operating in a back-flushing phase, the filtering phase can proceed by using a bypass line 124 to bypass the second bead filter unit 132 while the second bead filter unit 132 is being operated in the back-flushing phase.

Although both of the units can be operated in the back-flushing phase at about the same time, the first bead filter unit 122 can operate in the back-flushing phase independent of the second bead filter unit 132. For example, back-flushing the first bead filter unit 122 does not require back-flushing of the second bead filter unit 132 at the same time. Similarly, the second bead filter unit 132 can operate in the back-flushing phase independent of the first bead filter unit 122. For example, back-flushing the second bead filter unit 132 does not require back-flushing of the first bead filter unit 122 at the same time. This ability to independently back-flush the first bead filter unit 122 and second bead filter unit 132 has the advantage of reducing the overall duration that the aquaculture filtration system 100 is not operating in the filtering phase or otherwise taken offline. An additional benefit is that the frequency of back-flushing the first bead filter unit 122 can be different from the frequency of back-flushing the second bead filter unit 132. For example, in a typical case, the second bead filter unit is back-flushed once every eight times the first bead filter unit 122 is back-flushed. It can be preferable to minimize the frequency of the back-flushing phase of either or both units because, as the frequency of the back-flushing phase increases, the amount of discharged water that must be treated increases and thus so does, for example, the size of the wastewater treatment system. However, the frequency of back-flushing the first bead filter unit 122 and second bead filter unit 132 is not particularly limited and a skilled person will readily appreciate that other frequencies can be used without departing from the present invention.

In an embodiment, the first bead filter unit 122 can be operated in a back-flushing phase by closing valve 118 to prevent water from the tidal basin 102 from entering the first bead filter unit 122 and to direct the flow to a drain or a wastewater treatment plant 160. Valve 126 can also be closed to prevent water from entering the bypass line represented by conduit 124. Valve 128 can also be closed to prevent water from entering the second bead filter unit 132. During the back-flushing phase of the first bead filter unit 122, the air inlet 161 can be opened to facilitate the back-flushing by introducing air to the first bead filter unit 122. As the introduced air flows in the upwards direction, the introduced air can agitate or disrupt the beads to loosen or otherwise free collected particles and other waste such that the particles and waste can be removed from the first bead filter unit 122 during the back-flushing. In a typical operation, the back-flushing can remove about 95% of the particles and waste, but the percentage of particles and waste removed is not particularly limited and thus greater than 95% or less than 95% of the particles and waste can be removed.

In an embodiment, after the first bead filter unit 122 has been back-flushed, forward flow can be re-introduced into the first bead filter unit 122 to remove residual particles and waste remaining in the first bead filter unit 122 and corresponding conduits. The forward flow can be directed through the bypass line, which includes conduit 124 and valve 126, to the tidal basin 102, such that the residual particles and waste to do have an opportunity to enter the second bead filter 132. Prior to re-introducing the forward flow, valve 118 can be opened to direct water to the first bead filter unit 122, valve 130 can remain closed to prevent the particles and waste from entering the second bead filter unit 132, and valve 126 can be opened to direct the flow through conduit 124 and the bypass line. The forward flow can proceed for any suitable duration until the particles and waste have been removed from the first bead filter tank 122 and entered the tidal basin 102. In an embodiment, the duration can be about 30 s. The duration, however, is not particularly limited and a skilled person will readily appreciate that the duration can be greater than or less than about 30 s.

In an embodiment, upon the completion of the back-flushing phase of the first bead filter unit 122, the aquaculture filter system can return to operating in the filtering phase. To return to the filtering phase, the valve 126 can be closed and the valve 130 can be opened to resume normal operation.

In an embodiment, the second bead filter unit 132 can be operated in a back-flushing phase. For example, the back-flushing of the second bead filter unit 132 can proceed by opening valve 156 to direct waste through conduit 154 to the drain or a wastewater treatment plant 180; closing valve 130 to prevent fluid from first bead filter unit 122 from entering the second bead filter unit 132; closing valve 148 to prevent fluid from the inoculation pump 142 from entering the second bead filter unit 132; closing valve 136 to prevent fluid from entering conduit 134; and closing valve 160 to prevent fluid from entering the inoculation tank 138. In addition, air inlet 162 to the second bead filter unit 132 can be opened. Air inlet 162 can introduce air to the second bead filter unit 132 to facilitate back-flushing. For example, as the introduced air flows in the upwards direction, the introduced air can agitate or disrupt the beads to loosen or otherwise free collected particles and other waste such that the particles and waste can be removed from the second bead filter unit 132 during the back-flushing.

During any portion of the back-flushing of the second bead filter unit 132, the first bead filter unit 122 can operate in a filtering phase via the bypass line 124. To operate the first bead filter unit 122 in a filtering phase while the second bead filter unit 132 is operating in a back-flushing phase, valves 126 and 130 can be closed. The operation of the first bead filter unit 122 in the filtering phase can then proceed, wherein water from the tidal basin flows through the first bead filter unit and, upon exiting the first bead filter unit, the water flows through bypass line represented by conduit 124 and open valve 126 and back to the tidal basin. The operation of the second bead filter unity 132 in the back-flushing phase can proceed as described above.

In an embodiment, the aquaculture filtration system can operate in an inoculation phase. The inoculation phase can operate in a first stage or a second stage, or a combination of a first stage and a second stage. The first stage can be used to kill or at least remove undesirable bacteria from the aquaculture filtration system 100. The first stage typically includes only the first bead filter unit 122 and the tidal basin 102, but it can optionally further include, or only include, the second bead filter unit 132 and the inoculation tank 138. The second stage can be used to grow bacteria in the second bead filter unit 132 using the inoculation tank 138. While the terms "first stage" and "second stage" are used herein, the modifiers "first" and "second" are not intended to suggest or require a particular order or sequence in which the stages must be performed. Rather, the first stage and the second stage can be operated independently of each other, in any order, or at about the same time.

The first stage of the inoculation phase can proceed by removing all aquatic organisms from the tidal basin 102, if present, and adding a cleaning fluid to the tidal basin 102. While the cleaning fluid is typically not saltwater, other than that the selection of the fluid is not particularly limited. It can be fresh water, which is usually sufficient to kill undesirable bacteria, or another type of fluid suitable for chemically treating the aquaculture filtration system. The amount of cleaning fluid added to the tidal basin should be sufficient for the circulation pump 106 to operate and can depend on factors, such as pump size and power, among other things. The cleaning fluid can then be circulated or flowed through the aquaculture filtration system to kill and remove undesirable bacteria.

In an embodiment, the aquaculture filtration system 100 can be configured to pump the cleaning fluid from the tidal basin 102 and through the first bead filter unit 122, where it exits through the bypass line including conduit 124 and valve 126 and returns to the tidal basin. For example, the cleaning fluid in the tidal basin 102 can flow through conduit 104 and valve 108 to pump 106. A proportion of the cleaning fluid can be returned to the tidal basin 102 through conduit 110 and open valve 112, or valve 112 can be in a closed position such that the fluid from circulation pump 106 flows through conduit 114 and valves 116 and 118 to the first bead filter unit 122. From the first bead filter unit 122, the cleaning fluid can flow through the bypass line including conduit 124 and open valve 126, with valve 130 in a closed position to prevent the cleaning fluid from flowing to the second bead filter unit 132. The cleaning fluid in the bypass line can be returned to the tidal basin 102 and recirculated one or more times. Prior to operating in the filtering phase, the aquaculture filter system 100 can be operated in a back-flushing phase to remove residual fluids and waste.

The use of the bypass line can allow the second bead filter unit 132 to remain undisturbed during operation of the first phase so that the bacteria therein continue to thrive and function. This allows the second bead filter unit 132 to be put into operation with minimal processing or at least without requiring growth or regrowth of bacteria, which is a slower process. In the alternative, the use of the bypass line can allow the second bead filter unit 132 to be operated in the second stage of inoculation phase as described below.

In an embodiment, the aquaculture filtration system 100 can pump the cleaning fluid from the tidal basin 102 through the first bead filter unit 122 and second bead filter unit 132 before being returned to the tidal basin 102. For example, the fluid can flow from the tidal basin 102 to the first bead filter unit 122 as described above. From the first bead filter unit 122, the cleaning fluid can flow through conduit 128 and open valve 130 to the second bead filter unit 132, with valves 126, 148, and 156 in a closed position so the cleaning fluid is directed to the second bead filter unit 132. The cleaning fluid can flow from the second bead filter unit 132 through conduit 134 and open valve 136 to the tidal basin 102, where it can be recirculated one or more times. Prior to operating in the filtering phase, the aquaculture filter system 100 can be operated in a back-flushing phase to remove residual fluids and waste.

The second stage of the inoculation phase can proceed with the addition of a stock solution to the inoculation tank. The stock solution can include water, bacteria, and feed, such as ammonia. The volume of the stock solution added to the tank can depend on several factors such as desired quantity or density of bacteria, as well as the size of the inoculation tank 138 and second bead filter unit 132, among other things. The stock solution and the components thereof to be used is not particularly limited. A skilled person will readily appreciate stock solutions suitable for use here. The stock solution can flow through the second bead filter unit 132, where the bacteria can grow on the beads of the second bead filter 172. The second stage can proceed for a duration sufficient to obtain a desired coverage of the bacteria on the beads. For example, the coverage of the bacteria on the beads of the bead filter can range from about 1% to about 100%, or any increment within that range. It can be desirable to achieve a coverage of at least about 50%. However, the coverage is not particularly limited and can depend on a desired level of treatment.

In an embodiment, an inoculation loop can be activated. The inoculation loop can include the second bead filter unit 132, inoculation tank 138, and inoculation pump 142. For example, the stock solution from the inoculation tank 138 can flow through conduit 140 and open valve 144 to inoculation pump 142, with valve 152 closed so the stock solution is not directed to the drain or wastewater treatment plant 185. The inoculation pump 142 can pump the stock solution through conduit 146 and open valve 148 to the second bead filter unit 132, with valves 130 and 156 in a closed position to prevent fluids from the first bead filter unit 122 from entering the second bead filter unit 132 and prevent the fluid from flowing through conduit 154 to the drain or wastewater treatment plant 185. In the second bead filter unit 132, the stock solution can contact the bead filter therein, where it can grow. The stock solution can flow upwards within the second bead filter unit 132 and then flow through conduit 158 and open valve 160 to return to the inoculation tank 138, where it can be recirculated one or more times. Prior to operating in the filtering phase, the second bead filter unit 132 can be operated in a back-flushing phase to remove residual stock solution.

Figure 2:
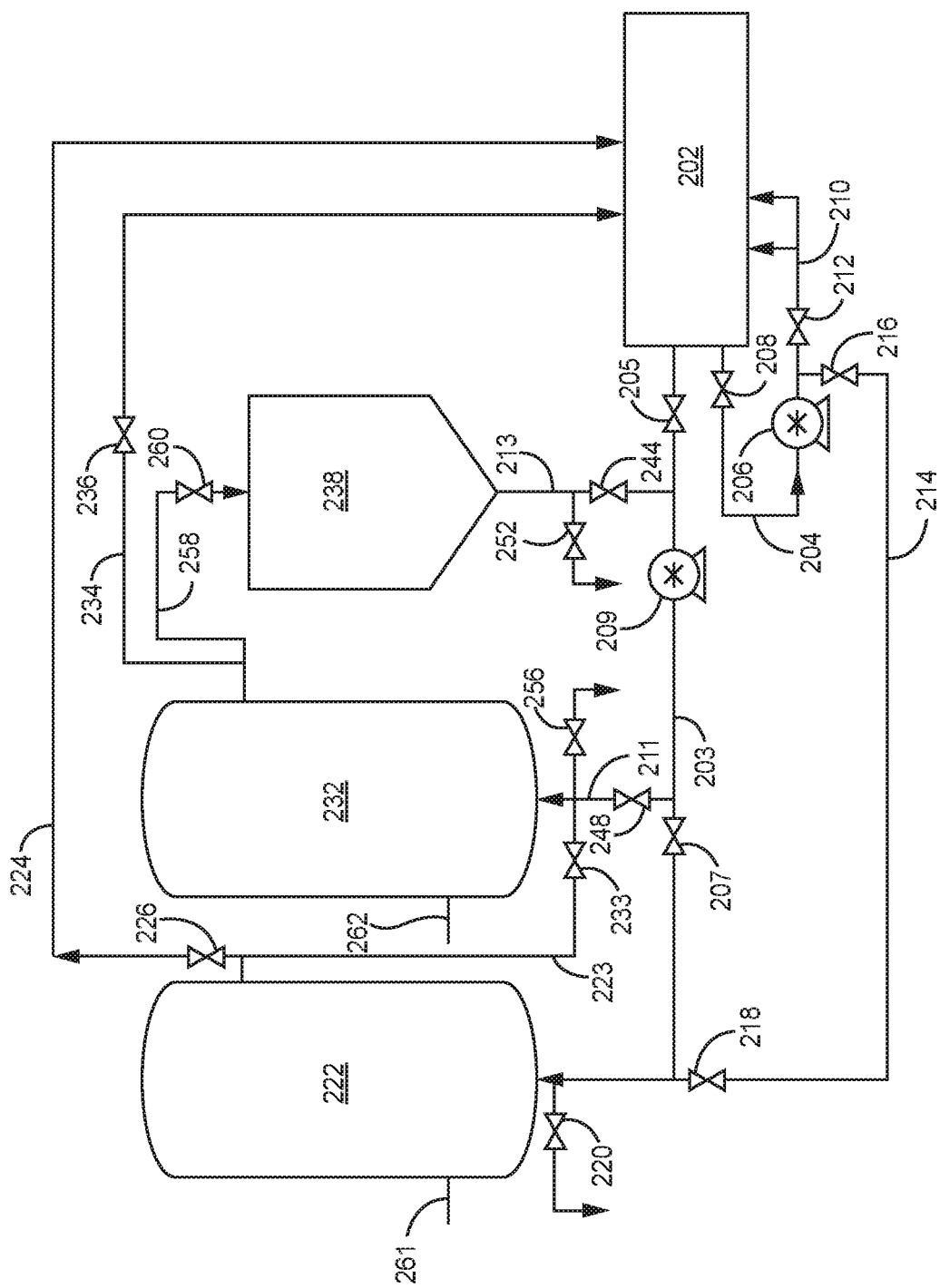
FIG. 2 is a schematic diagram of an aquaculture filtration system, according to one or more embodiments of the present disclosure.

FIG. 2 is a schematic diagram of an aquaculture filtration system 200, according to one or more embodiments of the present disclosure. The aquaculture filtration system 200 is similar to aquaculture filtration system 100 and includes various pumps and different configurations thereof. Accordingly, the reference numerals are similar except where the principle differences exist, in which case new reference numerals are used. As shown in FIG. 2, the aquaculture filtration system 200 comprises a tidal basin 202 in fluid communication with a circulation pump 206 and a bead filter pump 209; a first bead filter unit 222 in fluid communication with the bead filter pump 209; a second bead filter unit 232 in fluid communication with the first bead filter unit 222 and the tidal basin 202. The aquaculture filtration system 200 can optionally further comprise a bypass line 224 in fluid communication with the first bead filter unit 222 and the tidal basin 202, wherein the bypass line 224 is configured to bypass the second bead filter unit 232. The aquaculture filtration system 200 can further comprise an inoculation loop in fluid communication with the second bead filter unit 232, inoculation tank 238, and bead filter pump 209, wherein the inoculation loop is configured to circulate a stock solution containing biological agents.

The tidal basin 202 can be configured to deliver the fluid to the circulation pump 206 through conduit 204 and valve 208. The circulation pump 206 can be configured to receive the fluid from the tidal basin 202 and deliver it to the tidal basin 202. For example, the circulation pump can be configured to receive the fluid from the tidal basin 202 and return all or a portion of the fluid to the tidal basin 202 through conduit 210 and open valve 212. The circulation pump can also be configured to deliver all or a portion of the fluid to the first bead filter unit 222 through conduit 214 and open valves 216 and 218. The circulation pump 206 is typically configured to deliver all of the fluid to the tidal basin 202. The circulation pump 206 can be configured to deliver all or a portion of the fluid to the first bead filter unit 222 through cleaning-in-place conduit 214 where the aquaculture filtration system is operating in a back-flushing phase, which is typically only in instances where an additional pump is necessary to supplement a power deficiency resulting from the sole use of the bead filter pump 209.

The tidal basin 202 can also be configured to deliver the fluid to the bead filter pump 209 through conduit 203 and open valve 205. The bead filter pump 209 can be configured to receive the fluid from the tidal basin 202 and deliver it to one of the first bead filter unit 222 and the second bead filter unit 232. For example, the bead filter pump 209 can be configured to deliver the to the first bead filter unit 222 through conduit 203; or the bead filter pump can be configured to deliver the fluid to the second bead filter unit 232 through conduits 203 and 211. The fluid can be directed through conduit 203 to the first bead filter unit 222 if valves 205 and 207 are configured in an open position and valves 148 and 244 are configured in a closed position. The fluid can be directed through conduits 203 and 211 to the second bead filter unit 232 if valves 205 and 248 are configured in an open position and valves 207 and 244 are configured in a closed position.

An inoculation loop can be provided in the aquaculture filtration system 200 using the bead filter pump 209 as an inoculation pump. The inoculation loop is largely the same as the inoculation loop discussed above with respect to the aquaculture filtration system 100, with the exception of the fluid flow from the inoculation tank 238 to the bead filter unit 232, which will be discussed. The inoculation tank 238 can be in fluid communication with the bead filter pump 209 through conduits 213 and 203 and open valve 244. To direct the fluid from the inoculation tank 238 to the bead filter pump 209, valves 205 and 252 can be configured in a closed position and valve 244 can be configured in an open position. The bead filter pump can be in fluid communication with the second bead filter unit 232 through conduits 203 and 211. To direct the fluid from the bead filter pump 209 to the second bead filter unit 232, valve 248 can be configured in an open position and valves 207, 230, and 256 can be configured in a closed position.

Other than the differences between aquaculture filtration systems 100 and 200 discussed above, the aquaculture filtration system 200 generally operates in a manner that is similar to aquaculture filtration system 100. To the extent other differences remain or are not discussed, such differences are either minor or adjustments can be readily implemented to achieve any of the purposes described herein. Accordingly, references herein are generally to the aquaculture filtration systems 100 and 200, but description herein shall be understood to equally apply to aquaculture filtration system 300.

Figure 3:
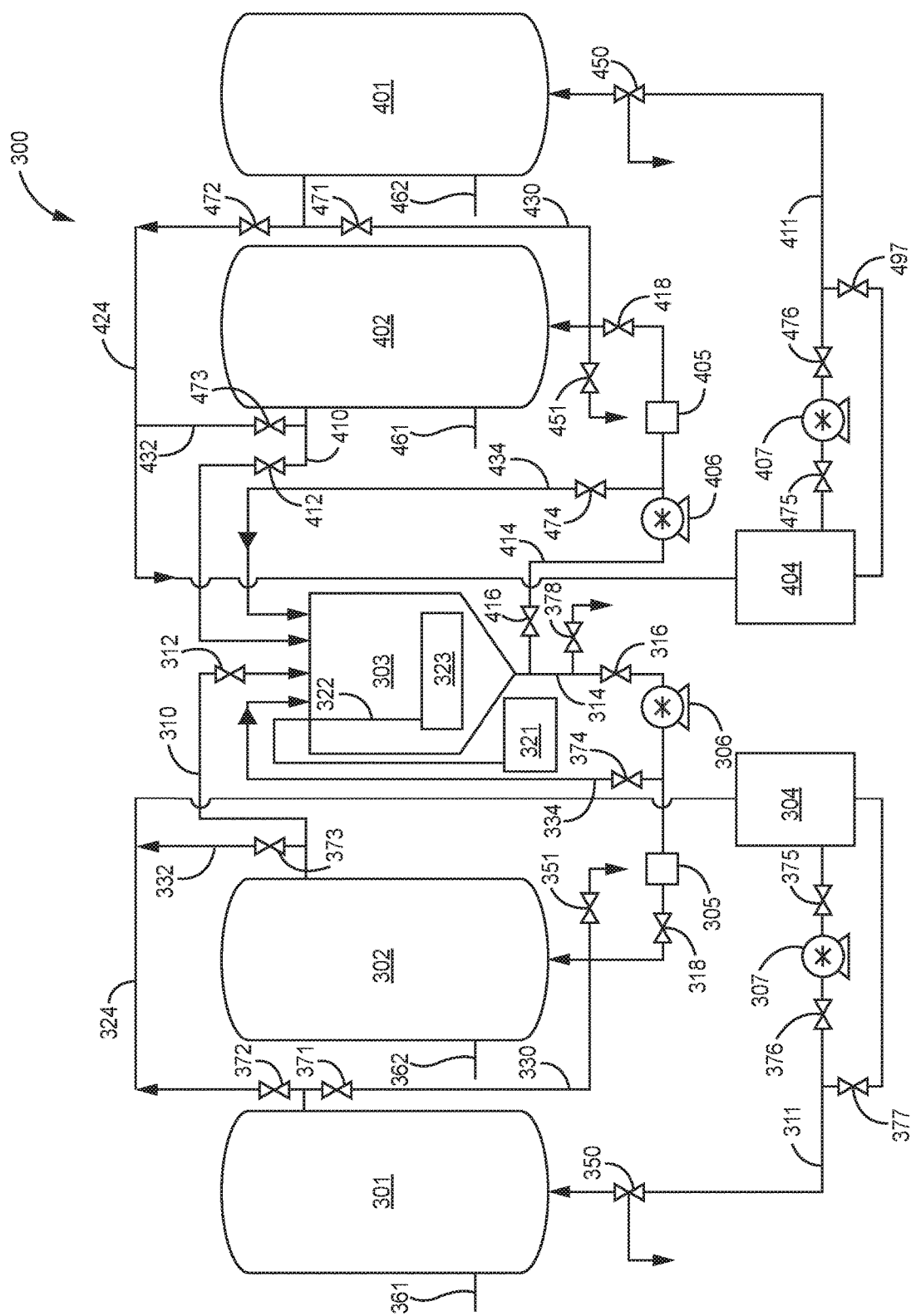
FIG. 3 is a schematic diagram of an aquaculture filtration system with dual inoculation of bead filter 2 units in which an inoculation tank is used to inoculate two bead filter 2 units, according to one or more embodiments of the present disclosure.

FIG. 3 is a schematic diagram of an aquaculture filtration system 300 in which an inoculation tank is used to inoculate two different second bead filter units, according to one or more embodiments of the invention. As shown in FIG. 3, the aquaculture filtration system 300 includes a second bead filter unit 302, a second bead filter unit 402, and an inoculation tank 303 in fluid communication with the second bead filter unit 302 and the second bead filter unit 402, wherein the inoculation tank 303 is used to inoculate the second bead filter unit 302 and to inoculate the second bead filter unit 402.

A conduit 310 may be provided for flowing a first fluid from the second bead filter unit 302 to the inoculation tank 303. Another conduit 314 may be provided for flowing the first fluid from the inoculation tank 303 back to the second bead filter unit 302. A pump 306 may be provide in-line with the conduit 314 for pumping the first fluid from the inoculation tank 303 to the second bead filter unit 302. A flow meter 305 may also be provided in-line with the conduit 314 for monitoring and/or controlling fluid flow through the conduit 314 and, more generally, fluid flowing through an inoculation loop formed by the second bead filter unit 302, the conduit 310, the inoculation tank 303, and the conduit 314. Said inoculation loop may further include valves 312, 316, and 318 which may be in an open configuration during operation of the inoculation loop. In some embodiments, the inoculation loop further includes a conduit 334 for redirecting fluid from the pump 306 back to the inoculation tank 303. In some embodiments, the inoculation tank 303 includes an air supply 321, a conduit for supplying air 322, and a soaker hose 323.

A conduit 410 may be provided for flowing a second fluid from the second bead filter unit 402 to the inoculation tank 303. Another conduit 414 may be provided for flowing the second fluid from the inoculation tank 303 back to the second bead filter unit 402. A pump 406 may be provide in-line with the conduit 414 for pumping the second fluid from the inoculation tank 303 to the second bead filter unit 402. A flow meter 405 may also be provided in-line with the conduit 414 for monitoring and/or controlling fluid flow through the conduit 414 and, more generally, fluid flowing through an inoculation loop formed by the second bead filter unit 402, the conduit 410, the inoculation tank 303, and the conduit 414. Said inoculation loop may further include valves 412, 416, and 418 which may be in an open configuration during operation of the inoculation loop. In some embodiments, the inoculation loop further includes a conduit 434 for redirecting fluid from the pump 406 back to the inoculation tank 303.

In addition to the inoculation loop, the second bead filter unit 302 may be operated in combination with a first bead filter unit 301 to filter water from a tidal basin 304 and return it thereto in a filtered state. A conduit 311 may be provided for flowing a water from the tidal basin 304 to the first bead filter unit 301. A pump 307 may be provided in-line with the conduit 311 for pumping the water from the tidal basin 304 to the first bead filter unit 301. A conduit 330 may be provided for flowing water from the first bead filter unit 301 to the second bead filter unit 302. A conduit 332 may be provide for flowing water from the second bead filter unit 302 back to the tidal basin 304. In some embodiments, conduit 332 merges with conduit 324 as depicted. In some embodiments, instead of flowing from the first bead filter unit 301 to the second bead filter unit 302, the water from the first bead filter unit 301 may flow through bypass line 324 directly to the tidal basin 304.

Similarly, the second bead filter unit 402 may be operated in combination with a first bead filter unit 401 to filter water from a tidal basin 404 and return it thereto in a filtered state. A conduit 411 may be provided for flowing a water from the tidal basin 404 to the first bead filter unit 401. A pump 407 may be provided in-line with the conduit 411 for pumping the water from the tidal basin 404 to the first bead filter unit 401. A conduit 430 may be provided for flowing water from the first bead filter unit 401 to the second bead filter unit 402. A conduit 432 may be provide for flowing water from the second bead filter unit 402 back to the tidal basin 404. In some embodiments, conduit 432 merges with conduit 424 as depicted. In some embodiments, instead of flowing from the first bead filter unit 401 to the second bead filter unit 402, the water from the first bead filter unit 401 may flow through bypass line 424 directly to the tidal basin 404.

For operating in a back-flushing phase, the first bead filter unit 301 includes air inlet 361 and valve 350, and the second bead filter unit 302 includes an air inlet 362 and valve 351. The first bead filter unit 401 includes air inlet 461 and valve 451, and the second bead filter unit 402 includes air inlet 462 and valve 450.

The aquaculture filtration system 300 may further include one or more valves which may be configurable between an open configuration and a closed configuration. For example, the aquaculture filtration system 300 may further include one or more of valves 371-378 and 471-476 and 497. A person of ordinary skill in the art will recognize, either based on the configurations disclosed elsewhere herein and/or based on the particular arrangement of valves, conduits, and unit operations in FIG. 3, the multitude of configurations which are possible and within the scope of the invention. For example, the discussions above may be applied or modified and applied here to operate the aquaculture filtration system 300 in a filtering phase, a backflushing phase, and/or an inoculation phase.

Figure 4:
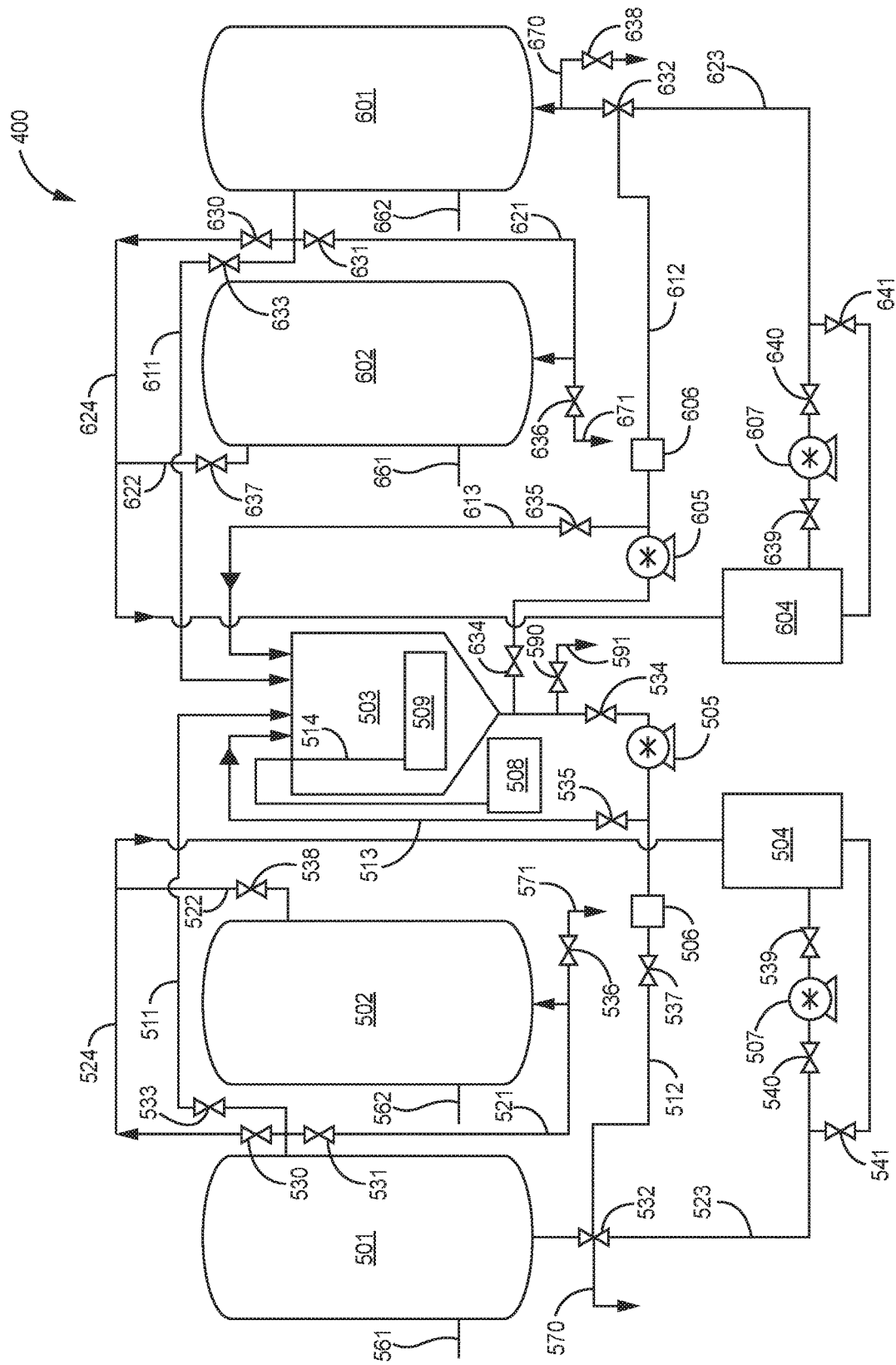
FIG. 4 is a schematic diagram of an aquaculture filtration system with dual inoculation of bead filter 1 units in which an inoculation tank is used to inoculate two bead filter 1 units, according to one or more embodiments of the present disclosure.

FIG. 4 is a schematic diagram of an aquaculture filtration system 400 in which an inoculation tank is used to inoculate two different first bead filter units, according to one or more embodiments of the invention. As shown in FIG. 4, the aquaculture filtration system 400 includes a first bead filter unit 501, a first bead filter unit 601, and an inoculation tank 503 in fluid communication with the first bead filter unit 501 and the first bead filter unit 601, wherein the inoculation tank 503 is used to inoculate the first bead filter unit 501 and to inoculate the first bead filter unit 601.

A conduit 511 may be provided for flowing a first fluid from the first bead filter unit 501 to the inoculation tank 503. Another conduit 512 may be provided for flowing the first fluid from the inoculation tank 503 back to the first bead filter unit 501. A pump 505 may be provide in-line with the conduit 512 for pumping the first fluid from the inoculation tank 503 to the first bead filter unit 501. A flow meter 506 may also be provided in-line with the conduit 512 for monitoring and/or controlling fluid flow through the conduit 512 and, more generally, fluid flowing through an inoculation loop formed by the first bead filter unit 501, the conduit 511, the inoculation tank 503, and the conduit 512. Said inoculation loop may further include valves 532, 533, 534, 537 which may be in an open configuration during operation of the inoculation loop. In some embodiments, the inoculation loop further includes a conduit 513 and a valve 535 for redirecting fluid from the pump 505 back to the inoculation tank 503. In some embodiments, the inoculation tank 503 includes an air supply 508, a conduit for supplying air 514, and a soaker hose 509.

A conduit 611 may be provided for flowing a first fluid from the first bead filter unit 601 to the inoculation tank 503. Another conduit 612 may be provided for flowing the first fluid from the inoculation tank 503 back to the first bead filter unit 601. A pump 605 may be provide in-line with the conduit 612 for pumping the first fluid from the inoculation tank 503 to the first bead filter unit 601. A flow meter 606 may also be provided in-line with the conduit 612 for monitoring and/or controlling fluid flow through the conduit 612 and, more generally, fluid flowing through an inoculation loop formed by the first bead filter unit 601, the conduit 611, the inoculation tank 503, and the conduit 612. Said inoculation loop may further include valves 632, 633, 634 which may be in an open configuration during operation of the inoculation loop. In some embodiments, the inoculation loop further includes a conduit 613 and a valve 635 for redirecting fluid from the pump 605 back to the inoculation tank 503.

In a filtering phase, the first bead filter unit 501 may be operated in combination with the second bead filter unit 502 to filter water from a tidal basin 504 and return it thereto in a filtered state. A conduit 523, optionally including valve 539, valve 540, and/or valve 541, may be provided for flowing a water from the tidal basin 504 to the first bead filter unit 501. A pump 507 may be provided in-line with the conduit 523 for pumping water from the tidal basin 504 to the first bead filter unit 501. A conduit 521, optionally including valve 531 and valve 536, may be provided for flowing water from the first bead filter unit 501 to the second bead filter unit 502. A conduit 522, optionally including valve 538, may be provided for flowing water from the second bead filter unit 502 back to the tidal basin 504. In some embodiments, conduit 522 merges with conduit 524 as shown. In some embodiments, instead of flowing from the first bead filter unit 501 to the second bead filter unit 502, the water from the first bead filter unit 501 may flow through bypass line 524, optionally including valve 530, directly to the tidal basin 504.

Similarly, the first bead filter unit 601 may be operated in combination with the second bead filter unit 602 to filter water from a tidal basin 604 and return it thereto in a filtered state. A conduit 623, optionally including valve 639, valve 640, and/or valve 641, may be provided for flowing a water from the tidal basin 604 to the first bead filter unit 601. A pump 607 may be provided in-line with the conduit 623 for pumping water from the tidal basin 604 to the first bead filter unit 601. A conduit 621, optionally including valve 631 and valve 636, may be provided for flowing water from the first bead filter unit 601 to the second bead filter unit 602. A conduit 622, optionally including valve 637, may be provided for flowing water from the second bead filter unit 602 back to the tidal basin 604. In some embodiments, conduit 622 merges with conduit 624 as shown. In some embodiments, instead of flowing from the first bead filter unit 601 to the second bead filter unit 602, the water from the first bead filter unit 601 may flow through bypass line 624, optionally including valve 630, directly to the tidal basin 604.

In a back-flushing phase, the first bead filter unit 501 includes air inlet 561, valve 532, and conduit 570, and the second bead filter unit 502 includes air inlet 562, valve 536, and conduit 571. The first bead filter unit 601 includes air inlet 661, valve 636, and conduit 671, and the second bead filter unit 602 includes air inlet 662, valve 638, and conduit 670. In some embodiments, the inoculation tank 503 includes conduit 591 and valve 590.

In addition to the valves discussed above, others may be present or absent. A person of ordinary skill in the art will recognize, either based on the configurations disclosed elsewhere herein and/or based on the particular arrangement of valves, conduits, and unit operations in FIG. 4, the multitude of configurations which are possible and within the scope of the invention. For example, the discussions above may be applied or modified and applied here to operate the aquaculture filtration system 400 in a filtering phase, a backflushing phase, and/or an inoculation phase.

In some embodiments, an aquaculture filtration system may include one or more first bead filter units comprising a first bead filter, wherein the first bead filter units are operable to: in a first filtering phase, remove first impurities from water using the first bead filter; and in a first back-flushing phase, remove a first waste from the first bead filter unit; and one or more second bead filter units comprising a second bead filter, wherein the second bead filter units are operable to: in a second filtering phase, remove second impurities from the water using the second bead filter; and in a second back-flushing phase, remove a second waste from the second bead filter unit; wherein the first back-flushing phase of the first bead filter units is operable independently of the second back-flushing phase of the second bead filter units.

In some embodiments, water from a tidal basin is directed to the first bead filter units and from the first bead filter units the water is directed to the second bead filter units. In some embodiments, water from a tidal basin is directed separately to the first bead filter units and the second bead filter units, wherein water exiting the first bead filter units is directed to the tidal basin and not directly to the second bead filter units, wherein water exiting the second bead filter units is directed to the tidal basin and not directly to the first bead filter units. In some embodiments, the first bead filter units remove solids and other physical matter and the second bead filter units reduce TAN and/or nitrite levels. In some embodiments, the first bead filter units reduce TAN levels and optionally remove solids, and the second bead filter units reduce nitrite levels and optionally remove solids. In some embodiments, the aquaculture filtration system further includes one or more third bead filter units. In some embodiments, the first bead filter units remove solids, the second bead filter units reduce TAN levels, and the third bead filter units reduce nitrite levels.

Figure 5:
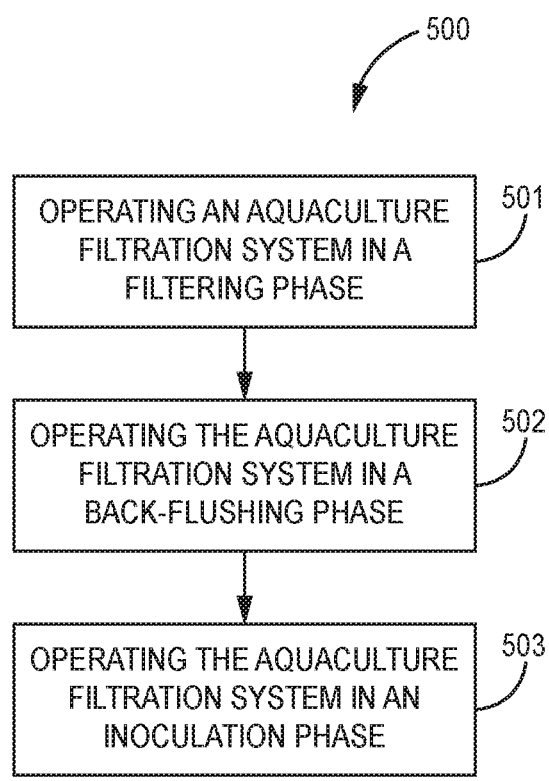
FIG. 5 is a flowchart of a method of operating an aquaculture filtration system, according to one or more embodiments of the present disclosure.

FIG. 5 is a method of operating an aquaculture filtration system, according to one or more embodiments of the present disclosure. As shown in FIG. 5, the method can comprise one or more of the following steps: operating an aquaculture filtration system in a filtering phase 501, wherein the filtering phase includes: supplying water from a tidal basin to a first bead filter unit to remove first impurities from the water; supplying water from the first bead filter unit to the second bead filter unit to remove second impurities from the water; and supplying water from the second bead filter unit to the tidal basin to sustain and/or promote a life of aquatic organisms residing in the tidal basin; operating the first bead filter unit, second bead filter unit, or both in a back-flushing phase 502, wherein the back-flushing phase includes: removing a first waste from the first bead filter unit at a first frequency; and optionally removing a second waste from the second bead filter unit at a second frequency; and operating the aquaculture filtration system in an inoculation phase 503, wherein the inoculation phase includes a first stage and a second stage, wherein the first stage includes circulating a cleaning fluid from the tidal basin to the first bead filter unit and optionally the second bead filter unit; wherein the second stage includes circulating a stock solution through the second bead filter unit.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. An aquaculture filtration system, comprising:
    a first bead filter unit comprising a first bead filter, wherein the first bead filter unit receives water from a tidal basin and is operable to:
        in a first filtering phase, remove first impurities from the water using the first bead filter; and
        in a first back-flushing phase, remove a first waste from the first bead filter unit;
    a second bead filter unit comprising a second bead filter, wherein the second bead filter unit receives water from the first bead filter unit and is operable to:
        in a second filtering phase, remove second impurities from the water using the second bead filter; and
        in a second back-flushing phase, remove a second waste from the second bead filter unit; and
    an inoculation tank, the inoculation tank and the second bead filter unit forming an inoculation loop, wherein the second bead filter unit receives a stock solution from the inoculation tank and the inoculation tank receives the stock solution exiting from the second bead filter unit, and
    wherein the first back-flushing phase of the first bead filter unit is operable independently of the second back-flushing phase of the second bead filter unit.

2. The system of claim 1, wherein the first bead filter unit is operated in the first back-flushing phase at a first frequency and the second bead filter unit is operated in the second back-flushing phase at a second frequency.

3. The system of claim 2, wherein the first frequency is different from the second frequency.

4. The system of claim 2, wherein the first frequency is greater than the second frequency.

5. The system of claim 1, wherein the first bead filter includes a first plurality of beads.

6. The system of claim 1, wherein the second bead filter includes a plurality of biological agents grown on surfaces of a second plurality of beads.

7. The system of claim 6, wherein the biological agents are selected from bacteria and other microbes capable of reducing total ammonia nitrogen levels and/or nitrite levels.

8. The system of claim 1, wherein in the first filtering phase, the first bead filter unit filters the water by collecting the first impurities on surfaces of a first plurality of beads; wherein in the second filtering phase, the second bead filter stage filters the water by collecting the second impurities on surfaces of a second plurality of beads.

9. The system of claim 1, wherein the first impurities include particles.

10. The system of claim 1, wherein the second impurities include chemical impurities, biological impurities, or a combination thereof.

11. The system of claim 1, wherein water filtered by the first bead filter unit and the second bead filter unit is provided to a tidal basin that houses one or more aquatic organisms.

12. The system of claim 1, wherein in the first back-flushing phase, waste is drained from the first bead filter unit after air is introduced to the first bead filter unit to agitate the first plurality of beads.

13. The system of claim 1, further comprising a bypass line for bypassing the second bead filter unit, wherein the bypass line receives the water from the first bead filter unit and directs the water to the tidal basin.

14. The system of claim 1, wherein the inoculation loop is activated to grow biological agents on surfaces of the second plurality of beads.

15. A method of operating an aquaculture filtration system, comprising:
    operating an aquaculture filtration system in a filtering phase, wherein the filtering phase includes:
        supplying water from a tidal basin to a first bead filter unit to remove first impurities from the water;
        supplying water from the first bead filter unit to the second bead filter unit to remove second impurities from the water; and
        supplying water from the second bead filter unit to the tidal basin to sustain and/or promote a life of aquatic organisms residing in the tidal basin;

operating the first bead filter unit, second bead filter unit, or both in a back-flushing phase, wherein the back-flushing phase includes:

removing a first waste from the first bead filter unit at a first frequency; and removing a second waste from the second bead filter unit at a second frequency; and operating the second bead filter unit in an inoculation phase, wherein the inoculation phase includes circulating a stock solution to grow biological agents on surfaces of a second bead filter of the second bead filter unit.

16. The method of claim 15, wherein the first frequency and the second frequency are different.

17. The method of claim 15, wherein the first frequency is greater than the second frequency.

18. The method of claim 15, wherein the first impurities include particles and the second impurities include chemical and/or biological impurities.

* * * * *